(12) United States Patent
Gundavelli et al.

(10) Patent No.: US 12,177,929 B2
(45) Date of Patent: Dec. 24, 2024

(54) NETWORK-INITIATED GROUP DISCONNECT FOR WIRELESS DEVICES

(71) Applicant: Cisco Technology, Inc., San Jose, CA (US)

(72) Inventors: Srinath Gundavelli, San Jose, CA (US); Vimal Srivastava, Bangalore (IN); Timothy Peter Stammers, Raleigh, NC (US); Ravi Kiran Guntupalli, Cumming, GA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 374 days.

(21) Appl. No.: 17/833,334

(22) Filed: Jun. 6, 2022

(65) Prior Publication Data
US 2023/0397296 A1    Dec. 7, 2023

(51) Int. Cl.
*H04W 76/00* (2018.01)
*H04W 60/04* (2009.01)
*H04W 76/10* (2018.01)
*H04W 76/30* (2018.01)

(52) U.S. Cl.
CPC .......... *H04W 76/30* (2018.02); *H04W 60/04* (2013.01); *H04W 76/10* (2018.02)

(58) Field of Classification Search
CPC .......... H04B 7/18563; H04W 8/186; H04W 12/033; H04W 60/04; H04W 60/06; H04W 68/00; H04W 76/10; H04W 76/19; H04W 76/30; H04W 76/40
See application file for complete search history.

(56) References Cited

U.S. PATENT DOCUMENTS

| | | | |
|---|---|---|---|
| 10,524,166 B2* | 12/2019 | Youn | H04W 36/144 |
| 11,013,052 B2* | 5/2021 | Dao | H04L 67/62 |
| 11,382,145 B2* | 7/2022 | Dao | H04W 4/06 |
| 2019/0166467 A1 | 5/2019 | Livanos et al. | |

(Continued)

FOREIGN PATENT DOCUMENTS

WO    2020168467 A1    8/2020

OTHER PUBLICATIONS

"3rd Generation Partnership Project; Technical Specification Group Services and System Aspects; System architecture for the 5G System (5GS); Stage 2 (Release 16)," 3GPP, TS 23.501 V16.12.0, 454 pages, Mar. 2022.

(Continued)

*Primary Examiner* — Frank Duong
(74) *Attorney, Agent, or Firm* — Edell, Shapiro & Finnan, LLC

(57) ABSTRACT

Presented herein are techniques to provide a network-initiated group disconnect for wireless devices belonging to one or more device group(s). In one example, a method may include determining, by a control element of a network, that at least one device group is to be disconnected from the network, wherein the at least one device group comprises a plurality of wireless devices connected to the network; identifying one or more access network radios through which the plurality of wireless devices are connected to the network; and triggering a disconnect command for the at least one device group to be broadcast from each of the one or more access network radios to trigger the plurality of wireless devices to disconnect from the network.

20 Claims, 6 Drawing Sheets

(56) References Cited

U.S. PATENT DOCUMENTS

| | | | |
|---|---|---|---|
| 2019/0261260 A1* | 8/2019 | Dao | H04W 48/00 |
| 2020/0329450 A1 | 10/2020 | Youn et al. | |
| 2020/0351980 A1* | 11/2020 | Talebi Fard | H04W 76/40 |
| 2021/0409941 A1* | 12/2021 | Rajendran | H04W 80/02 |
| 2022/0046752 A1* | 2/2022 | Lee | H04W 76/40 |
| 2023/0199911 A1* | 6/2023 | Jung | H04W 76/30 370/329 |

OTHER PUBLICATIONS

"3rd Generation Partnership Project; Technical Specification Group Services and System Aspects; System architecture for the 5G System (5GS); Stage 2 (Release 17)," 3GPP, TS 23.501 V17.4.0, 567 pages, Mar. 2022.

"3rd Generation Partnership Project; Technical Specification Group Services and System Aspects; Procedures for the 5G System (5GS); Stage 2 (Release 16)," 3GPP, TS 23.502 V16.12.0, 615 pages, Mar. 2022.

"3rd Generation Partnership Project; Technical Specification Group Services and System Aspects; Procedures for the 5G System (5GS); Stage 2 (Release 17)," 3GPP, TS 23.502 V17.4.0, 738 pages, Mar. 2022.

Mukul Sharma, "SIM vs eSIM vs iSIM: What's the Difference?," OnSiteGo, 7 pages, Feb. 2, 2022; https://onsitego.com/blog/sim-vs-esim-vs-isim-differences-explained/.

"Authentication Authorization and Accounting Configuration Guide Cisco IOS XE Release 3S," Cisco Content Hub, Cisco 4000 Series Integrated Services Routers, 5 pages, Aug. 6, 2019; https://content.cisco.com/chapter.sjs?uri=/searchable/chapter/content/en/us/td/docs/ios-xml/ios/sec_usr_aaa/configuration/xe-3s/sec-usr-aaa-xe-3s-book/sec-rad-pack-disctnt.html.xml.

* cited by examiner

NETWORK-INITIATED GROUP DISCONNECT FOR WIRELESS DEVICES

TECHNICAL FIELD

The present disclosure relates to network equipment and services.

BACKGROUND

Networking architectures have grown increasingly complex in communications environments, particularly mobile networking environments. In particular, different mobile network paradigms have been introduced involving different technologies and deployment environments, such as network slicing, third Generation Partnership Project (3GPP) private networks, neutral host radio access networks (RANs), combinations thereof, and the like. With the introduction of new mobile network paradigms, there are significant challenges in managing network communications and connectivity for wireless mobile network devices.

DESCRIPTION OF EXAMPLE EMBODIMENTS

Overview

Figure 1:
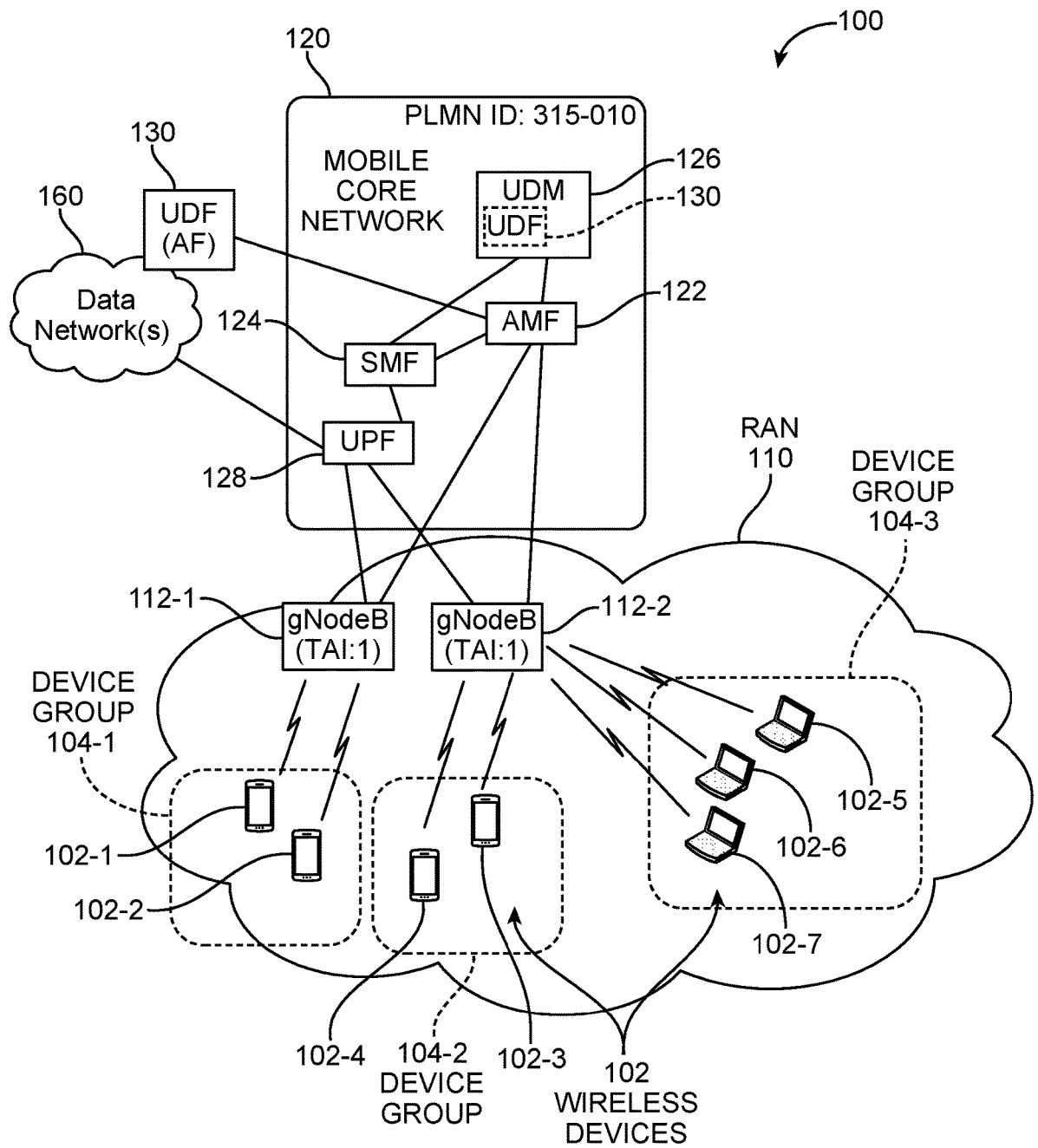
FIG. 1 is a block diagram of a system in which techniques may be implemented to provide a network-initiated group disconnect for wireless devices, according to an example embodiment.

Presented herein are techniques to provide a network-initiated group disconnect for wireless devices belonging to one or more device group(s). In particular, techniques presented herein involve leveraging session-level device grouping(s) such that system registration and/or session update procedures can be broadcast via a radio access network to one or more device group(s) without having to perform individual session level updates for each wireless device of each device group. The network-initiated group disconnect techniques described herein can improve spectrum utilization in a wireless network, reduce signaling between a radio access network (RAN) and mobile core network/wireless network controller functions, and/or reduce operational overhead during failure scenarios or critical operation scenarios. In various implementations, techniques provided herein can be utilized in different wireless networking architectures, such as in wireless wide area (WWA) access network architectures (e.g., Third Generation Partnership Project (3GPP) Fifth Generation (5G) mobile networks, Sixth Generation (6G) mobile networks, etc.) and/or in wireless local area (WLA) access network architectures.

In one embodiment, a method is provided that may include determining, by a control element of a network, that at least one device group is to be disconnected from the network, wherein the at least one device group comprises a plurality of wireless devices connected to the network; identifying one or more access network radios through which the plurality of wireless devices are connected to the network; and triggering a disconnect command for the at least one device group to be broadcast from each of the one or more access network radios to trigger the plurality of wireless devices to disconnect from the network.

Example Embodiments

As referred to herein, a wireless wide area (WWA) access network, such as a cellular/Third (3rd) Generation Partnership Project (3GPP) access networks, may be characterized as a Radio Access Network (RAN) having radio nodes (also referred to herein as access network radios) such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG or NG) access networks, Radio Units (RUs) for disaggregated virtualized RAN (vRAN) architectures, and/or the like that provide a larger RAN coverage area as compared to the RAN coverages area typically provided by wireless local area (WLA) radio nodes/access network radios (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node/access network radio is often larger than the WLA RAN coverage area provided by a WLA radio node/access network radio. Additionally, a WWA RAN radio node can typically provide radio access connectivity for a larger number of devices as compared to a WLA RAN radio node/access network radio. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizen Broadband Radio Service (CBRS) access network and/or a 3GPP cellular (4G/LTE, 5G, nG, etc.) access network) may provide network connectivity/services to clients (e.g., wireless devices, users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers, enterprises network operators/service providers (e.g., Cisco®, etc.), and/or third party network operators/service providers (e.g., neutral host network operators/service providers, cloud service providers, etc.). A private network may also be referred to as a standalone non-public network (SNPN) or a Public Network Integrated Non-Public Network (PNI-NPN) in some instances. Cisco is a registered trademark of Cisco Technology, Inc.

Further as referred to herein, an 'enterprise' or 'enterprise entity' may be considered to be a business, government, educational institution, an organization, and/or the like that may include multiple enterprise locations (or sites), such as a main campus, remote branches, any operating environment of private WWA or WLA (e.g., factory floor, port, mining facility, electric grid, etc.) and so on. Enterprise devices (e.g., enterprise wireless devices, user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc.) for enterprise users associated with one or more UE, and/or the like.

Additionally, with reference to various examples discussed herein, network slicing is a concept of 3GPP 5G system (5GS)/nG architectures. A network slice is a logical end-to-end network that can be dynamically created and may include any combination of 3GPP mobile core network functions/functionality. Generally, a network slice, also referred to generally as a 'slice', 'instantiated slice', or 'slice instance', can refer to a group or set of Virtualized Network Functions (VNFs) that are configured to facilitate a certain mobile network service or group of mobile network services.

A given wireless device (e.g., UE) may have access to multiple network slices over the same Radio Access Network (RAN). Each network slice may serve a particular service type with an agreed upon Service-level Agreement (SLA). To provide mobile network services associated with a given network slice type, a slice of the given slice type can be instantiated in which the instantiated slice for the slice type can provide certain mobile network services to a number of UEs.

A network slice instance within a Public Land Mobile Network (PLMN) can include any combination of nG RAN and/or core network control plane and user plane network functions. Per-3GPP Technical Specification (TS) 23.501, a Single-Network Slice Selection Assistance Information (S-NSSAI) indicator can be used to uniquely identify a slice in which an S-NSSAI includes a Slice/Service Type (SST) indication, which indicates the expected slice behavior for a slice requested by a UE in terms of expected features and services, and, optionally, can include a Slice Differentiator (SD), which can be used to differentiate among multiple slices of a same SST.

Different types of network slices (network slice types) can be configured for a mobile network such that each slice type can provide certain mobile network services. As referred to herein and in the claims, the terms 'slice', 'slice instance', 'network slice', and/or variations thereof may be used interchangeably to refer to a type of network slice that can be instantiated (e.g., configured, created, validated, operated, managed, etc.) within a mobile core network to provide one or more mobile network services for one or more user equipment. Various VNFs that can be configured for a slice type in accordance with techniques described herein can include any combination of 3GPP Fourth Generation/Long Term Evolution (4G/LTE) VNFs, 5G VNFs, 6G VNFs, etc., as may be prescribed, at least in part, by 3GPP standards.

Various example network slice types can include, but not be limited to, a cellular vehicle to everything (V2X) slice type that can provide cellular V2X services, an Internet of Things (IoT or IOT) massive IoT (mIoT) slice type that can provide IoT related services, an Ultra-Reliable Low-Latency Communication (URLLC) slice type that can provide URLLC services, an enhanced Mobile Broadband (eMBB) slice type that can provide mobile broadband services, a massive Machine-Type Communication (mMTC) slice type that can provide MTC services, a High Performance Machine-Type Communication (HMTC) slice type that can provide HMTC services, etc. Other slice types can be envisioned.

For various examples herein, a network slice requested by a wireless device (e.g., a UE) can be referenced generally as a number or value, formatted as "S-NSSAI: #" in various examples herein, in which the number (#) can correspond to an SST value and, optionally, an SD, in accordance with 3GPP specifications. It is to be understood that any SST values may be configured by a mobile network operator for other slice types. Additionally, slice type values used for various examples/embodiments described herein may differ from standardized SST values provided by 3GPP specifications. However, it is to be understood that the slice type values discussed for examples/embodiments herein are provided for illustrative purposes only in order to illustrate various features of the techniques described herein and are not meant to limit the broad scope of the present disclosure.

In the current 3GPP 5GS architecture, there are no available semantics that the 5G network can use for disconnecting a group of connected wireless devices (e.g., UEs). However, there are many use-cases in industrial applications in which the mobile core network, in conjunction with an Application Function (AF) may seek to disconnect a group of wireless devices. The scope and/or identification of wireless devices may be subject to disconnect can be determined by an enterprise/enterprise AF based on various enterprise use-cases and/or could be related to network failure(s) that may trigger a purge of a set of devices. For example, the scope/identification of wireless devices that may be subjected to disconnect from a network could be dependent on Protocol Data Unit (PDU) session identification/type/etc., a network slice, a core network event/failure, a RAN event/failure, and/or the like.

The ability for the network to detach or disconnect a group of devices, possibly hundreds of devices with a single trigger could provide a new and useful semantic, especially in factory automation use-cases, where fault event detection triggered by an AF may involve the detachment of a group of wireless devices that may be part of an automation process.

Currently available semantics provided in 3GPP networks allow an Access and Mobility Management Function (AMF) to send a Non-Access Stratum (NAS) message either to trigger a PDU session disconnect or unregister/reregister action, but the currently available semantics involve the AMF sending such messaging on a per-device basis over the NAS interface to each wireless device. Such triggering performed on a per-device basis using currently available semantics can be inefficient and can consume a significant amount of core network and/or RAN resources and, additionally, can add latency to the process of disconnecting many different wireless devices.

A new semantic that could be used to trigger a detach/disconnect for a group of devices could also be leveraged in currently known use-cases. For example, consider a use-case in which a User Plane Function (UPF) in a mobile core network goes down/fails such that all wireless devices handled by the UPF can become unreachable by the IP Multimedia Subsystem (IMS) network and no terminating calls can be initiated to the devices. A current solution for this problem involves the IMS network triggering each of the wireless devices on an individual device basis to disconnect and reconnect. Although it could be argued that high availability (HA) (e.g., UPF redundancy) could be provided in the network to address such issues, there are other failure points that may still involve per-wireless device level triggers. For example, in another scenario when the core network decides to bring down a network slice for operational reasons, the network is to trigger each of the wireless device supported by the network slice to detach from the network slice.

3GPP standards have defined an ability to define a group identifier for a set of devices, as described in Section 5.9.7 of 3GPP TS 23.501, referred to as an 'Internal-Group Identifier', but the applicability of scenarios involving the 3GPP-defined group identifier is currently limited to actions taken in the core. An example of such actions could be as defined in Section 5.19.7.5 of 3GPP TS 23.501 involving group-specific NAS level congestion control. However, 3GPP standards do not address the impact of a multiple UE disconnect or a group disconnect scenario involving an expensive resource in the network, which is the RAN interface and spectrum resources. As per current standards, any RAN procedures related to session disconnects (e.g., PDU session termination) are wireless device/UE specific and, in instances involving the use-cases described above, the RAN (triggered via an AMF or Mobility Management Entity (MME)) is to initiate individual device disconnects, which results in sequential communication over the air interface to each wireless device/UE and, thus, can consume valuable RAN resources/spectrum.

Accordingly, there is value in providing new semantics for triggering a group disconnect via a (single) message, such as through a broadcast message (e.g., via a cell broadcast notification or the like) targeting a group of wireless devices/UEs and the target resources from which the devices are to be detached, as discussed for various embodiment described herein.

Referring to FIG. 1, FIG. 1 is a block diagram of a system 100 in which techniques may be implemented to facilitate a network-initiated group disconnect for wireless devices connected to a wireless network, according to an example embodiment. As shown in FIG. 1, system 100 may include a number of wireless devices 102, a Radio Access Network (RAN) 110, a mobile core network 120, a User Disconnect Function (UDF) 130, and one or more data networks 160. RAN 110 may be implemented as a 3GPP 5G/next generation (nG) RAN and may include any number of gNodeBs (sometimes referred to as a 'gNBs'), such as a gNodeB 112-1 and a gNodeB 112-2.

Any number of wireless devices 102 may be present in system 100. For example, for the embodiment of FIG. 1, wireless devices 102-1, 102-2, 102-3, 102-4, 102-5, 102-6, and 102-7 are shown, however, it is to be understood that any number of wireless devices may be present in the system.

In at least one embodiment, mobile core network 120 may be representative of a 5G core (5GC) network or 5GS and may include an Access and Mobility Management Function (AMF) 122, a Session Management Function (SMF) 124, a Unified Data Management (UDM) entity 126, and a User Plane Function (UPF) 128. UDM 126 may interface with or include a Unified Data Repository (UDR), not shown in FIG. 1. For the embodiment of FIG. 1, mobile core network 120 may be associated with a PLMN identifier (ID) of '315-010'.

Although not illustrated in FIG. 1, it is to be understood that mobile core network 120 may also include any number of network slices instantiated for one or more network slice types provided by mobile core network 120 for various services (e.g., general services, mIoT services, URLLC services, etc.) that may be provided for one or more PDU sessions for wireless devices that may be present in mobile core network 120 in which each network slice may be identified by a corresponding S-NSSAI and may include any combination of VNFs, such as one or more SMF, UPF, Policy Control Function (PCF), UDM, Network Repository Function (NRF), Network Slice Selection Function (NSSF), Home Subscriber Server (HSS), Mobility Management Entity (MME), Serving Gateway (SGW), Packet Data Network (PDN) Gateway (PGW), any Control and User Plane Separation (CUPS) components, and/or the like in accordance with any 3GPP specifications.

In various embodiments, the data networks 160 of FIG. 1 may include be any combination of the Internet, a gaming network, an IP IMS, an Ethernet data network (not shown), Ethernet switching system(s) (not shown), an enterprise network managed/operated by an enterprise entity, and/or the like. In some embodiments, UDF 130 may be implemented as an Application Function (AF) via a data network 160. In some embodiments, UDF 130 may be implemented as a logical function or capability configured for an existing 3GPP function, such as part of UDM 126, a UDR, AMF 122, and/or a PCF configured for mobile core network 120. Thus, in some instances, the UDF 130 can be external to a control element, such as AMF 122.

RAN 110, via gNodeB 112-1 and 112-2, may interface with mobile core network 120 via one or more wired and/or wireless interfaces. For example, gNodeB 112-1 and 112-2 may interface with AMF 122 and with UPF 128. As discussed in further detail herein, below, RAN 110, via gNodeB 112-1 and gNodeB 112-2, may also interface with wireless devices 102 via one or more over-the-air Radio Frequency (RF) connections.

AMF 122 may further interface SMF 124, UDM 126, and UDF 130. UDM 126 may also SMF 124. Additionally, UPF 128 may also interface with data network(s) 160. The various interfaces shown in FIG. 1 are provided for illustrative purposes only and are not meant to limit the broad scope of the present disclosure. It is to be understood that network connectivity/interfaces among any of wireless devices 102, RAN 110, mobile core network 120 and data network(s) 160, and any elements/logic associated therewith, may be provided in any manner/configuration in accordance with 3GPP standards to facilitate operations as discussed for embodiments herein.

Generally, RAN 110 may include any combination of one or more 3GPP 5G/nG gNodeB or gNB, such as gNodeB 112-1 and gNodeB 112-2 and/or 3GPP 4G/LTE evolved node Bs (eNodeBs or eNBs), not shown, to facilitate network connectivity between wireless devices 102 and mobile core network 120. A gNodeB/eNodeB, such as gNodeB 112-1 and 112-2, may implement WWA (e.g., cellular) air interface and, in some instances also a WLA (e.g., Wi-Fi®) air interface, for any combination of Radio Access Technology (RAT) types (sometimes referred to more generally as 'accesses') for RAN 110 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like. Thus, a RAN, including any combination of gNodeBs/eNodeBs, may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, Wi-Fi, etc.) through which one or more wireless devices, such as wireless devices 102, may utilize to connect to RAN 110 for one or more PDU sessions (e.g., voice, video, data, gaming, combinations thereof, etc.) with a mobile core network, such as mobile core network 120.

Generally, the coverage area of a radio node/access network radio such as an eNodeB, gNodeB, etc. is typically referred to as a 'cell' in which one or more wireless devices 102 may attach to the radio node/access network radio that serves the coverage area/cell. In various embodiments, the coverage area of a radio node/access network radio can be identified through any combination of a Tracking Area Identifier (TAI), Routing Area Identifier (RAI), and/or the like as prescribed by 3GPP standards, etc. For the embodiment of FIG. 1, consider that gNodeB 112-1 and gNodeB 112-2 may each provide a coverage area for a given TAI, labeled in FIG. 1 as 'TAI:1'. In various embodiments, gNodeB 112-1 and gNodeB 112-2 can be identified using cell descriptors such as cell identifiers (IDs) including, but not limited to, Physical Cell Identifiers (PCIs), E-UTRAN Cell Global Identifiers (ECGIs), New Radio Cell Global Identifiers (NCGIs), and/or the like.

A wireless device, such as any of wireless devices 102, may be associated with any (enterprise) user, subscriber, employee, client, customer, electronic device, etc. wishing to initiate a flow in system 100 and may be inclusive of any device that initiates a communication in system 100, such as a UE, a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100. Thus, a wireless device may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes/access network radios of a RAN, such as RAN 110, for one or more sessions with a mobile core network, such as mobile core network 120.

In various embodiments, wireless devices 102 may be configured with any combination of Subscriber Identity Module (SIM) capabilities, such as embedded or electronic SIM (eSIM) capabilities, integrated SIM (iSIM) capabilities, and/or the like now known or hereafter developed. As referred to herein the term '(e-)(i-)SIM' may refer to any combination of SIM/eSIM/iSIM capable wireless device. Generally, an International Mobile Subscriber Identity (IMSI), Subscription Permanent Identifier (SUPI), and/or other Permanent Equipment Identifier (PEI) for a wireless device is stored in the (e-)(i-)SIM of a wireless device, along with other information, such as authentication material, such as authentication algorithms, authentication key(s), or the like.

In addition to various operations discussed for techniques herein, an AMF, such as of AMF 122, may be considered a control plane element or control element of mobile core network 120 and may facilitate access and mobility management control/services for one or more wireless devices 102 for establishing connection with mobile core network 120 (and/or one or more network slices of mobile core network, if applicable). In addition to various operations discussed for techniques herein, an SMF, such as SMF 124 may be considered another control plane element of mobile core network 120 and may be responsible for wireless device 102 PDU session management (SM), with individual functions/services being supported on a per-session basis in order to facilitate data transfer(s) between a given wireless device and one or more data network(s) 160 via one or more UPFs. Generally, a UPF, such as 128 may operate to provide packet routing and forwarding operations for user data traffic and may also perform a variety of functions such as packet inspection, traffic optimization, QoS, policy enforcement and user data traffic handling (e.g., to/from one or more data network(s) 160), and billing operations (e.g., accounting, etc.) for wireless device 102 PDU sessions.

Typically, a PCF (not shown for FIG. 1) stores policy data for the mobile core network 120 to provide policy control services (e.g., to facilitate access control for wireless devices 102, network selection, etc.). Typically, a UDM, such as UDM 126 stores subscription data (typically in combination with a UDR, not shown in FIG. 1) for subscribers (e.g., a user associated with a given wireless device 102) that can be retrieved and/or otherwise obtained/utilized during operation of system 100.

During operation of system 100 in at least one embodiment, various wireless device groups can be configured or otherwise formed for wireless devices 102. For example, when a wireless device 102 seeks to register with mobile core network 120, AMF 122 (or any other network function, such as a PCF, etc.) can assign or allocate one or more group identifier(s) (group-id(s) or Group-ID(s)) to the wireless device 102 based on one or more pre-configured attributes for one or more device group(s) to which the wireless device may belong. The group-id can be communicated to a given wireless device 102 as part of a registration process or a through a PDU session establishment procedure.

A single wireless device 102 can belong to multiple groups in accordance with various embodiments herein. Wireless device groups can be configured or formed using different formation criteria. In various embodiments, such criteria can include, but not be limited to: wireless devices belonging/connected to the same network slice/S-NSSAI; wireless devices belonging/connected to the same Data Network Name (DNN) (e.g., 'DNN:ims.com', etc.); wireless devices belonging/connected to a combination of S-NSSAI/DNN; wireless devices belonging to a set of S-NSSAIs or DNNs (or a combination thereof); wireless devices belonging to/included within an IMSI/SUPI/PEI range; wireless devices having multiple PDU session connections and/or a set of PDU sessions belonging to a group; wireless devices belonging to one or more access classes (which can be allowed or barred access based on access class) and/or any other criteria through which one or more wireless device groups can be formed. In various embodiments, wireless device groupings can be determined based on business logic, device profiling (e.g., device type, applications operating on device(s), etc.), and/or the like.

In one embodiment, a subscription profile for each wireless device 102-1-102-7 can be stored in UDM 126 that includes group-id(s) for each device group to which each wireless device 102-1-102-7 belongs. For instance, in one example, device subscription profiles can indicate a device identifier, such as an IMSI/SUPI/PEI for each device, in combination with a given PLMN-ID (e.g., 315-010) for mobile core network 120 and group-id(s) for each device (e.g., [IMSI-1: PLMN-ID: 315-010: Group ID: 100], [IMSI-2: PLMN-ID: 315-010: Group ID: 200], [IMSI-3: PLMN-ID: 315-010: Group ID: 100], [IMSI-4: PLMN-ID: 315-010: Group ID: 200], and so on).

In one example for the embodiment of FIG. 1, consider that wireless devices 102-1 and 102-2 may be allocated to belong to a device group 104-1 (e.g., Group-ID: 104-1), that wireless devices 102-3 and 102-4 may be allocated to belong to a device group 104-2 (e.g., Group-ID: 104-2), and that wireless devices 102-5, 102-6, and 102-7 may be allocated to belong to a device group 104-3 (e.g., Group-ID: 104-3). It is to be understood, however, that other variations of device groupings can be envisioned. Further for the embodiment of FIG. 1, consider that wireless devices 102-1 and 102-2 can connect to mobile core network 120 via gNodeB 112-1 and that wireless devices 102-3, 102-4, 102-5, 102-6, and 102-7 can connect to mobile core network 120 via gNodeB 112-2.

Although various example/embodiments described herein may reference group-id(s) as a criteria for determining a group of wireless devices 102 that are to be disconnected from a network, in some embodiments, instead of assigning/allocating group-id(s) to wireless devices 102, the mobile core network 120 (e.g., a network function within the network, such as UDF 130, if configured for UDM 126 and/or a PCF, UDM 126, a PCF, etc.) can specify certain network-specific filter(s), such as S-NSSAI(s)/network slice identifier(s) for network slice(s) to which certain device group(s) are connected/accessing, network location information (e.g., TAIs, etc.) for network resources, such as gNBs, eNBs, etc. utilized by devices of device group(s) and/or any other attribute(s) that could be used to identify a group of wireless devices that are to be disconnected from a network (e.g., mobile core network 120). Thus, although various example embodiments discussed below may be described with reference to group-id(s) being used to identify group(s) of wireless devices that are to be disconnected from the network, it is to be understood that any criteria, filters, etc. could be used to identify group(s) of wireless devices that can be disconnected from a network.

Following registration and/or PDU session creation for wireless devices 102-1-102-7 through which in at least one embodiment at least one group-id can be communicated to each wireless device 102-1-102-7, a disconnect may be triggered for one or more of device groups 104-1, 104-2, and/or 104-3. In accordance with embodiments herein, UDF 130 may obtain a notification from another core network function (e.g., a PCF, etc.) or an application function (e.g., an enterprise AF) regarding a disconnect that is to be performed for one or more of device groups 104-1, 104-2, and/or 104-3, which triggers UDF 130 to send a disconnect command or other disconnect indication/message to a control element of mobile core network 120, such as AMF 122, to facilitate a network-initiated group disconnect for the corresponding group(s) of wireless devices 102. In some embodiments, the notification/trigger towards the UDF 130 could be an operational trigger with/based on network administrator manual intervention.

For example, based on the notification obtained by the UDF 130 from another network function/AF, the UDF 130 can generate a disconnect message that can include any combination of: group-id(s) or other grouping criteria/filter(s)/etc.; any location/area/region identifier(s), such as TAI(s), RAI(s), gNodeB ID(s), and/or any other location/area/region identifier that may be applicable for resources (e.g., radio resources) associated a given region/area of mobile core network 120 in which a group disconnect is to be performed for one or more device group(s); and/or an indication of a type of disconnect and/or action that is to be performed by the wireless devices belonging to the corresponding group-id(s). In various embodiments, an action clause or indicator included a disconnect command/message/notification can include any actions, such as, for example, indicating that wireless devices belonging to a group are to perform a PDU session release or deactivate and/or session reconnect or reactivate, wireless device unregister and/or reregister actions, other additional information indicating operations/processes to be performed by wireless devices as part of a disconnect/detach action, and/or the like. In various embodiments, additional information included for a disconnect command may include indicating that wireless devices are to reattach within a certain time period or range (e.g., within one hour, etc.) of performing a particular disconnect action, indicating that wireless devices are to reattach after performing a reboot, combinations thereof, and/or the like.

Thus, broadly, a disconnect command/message generated by the UDF 130 may include various disconnect parameters, such as one or more group indications (group-id(s), group criteria, group filter(s), etc.), location/area/region indication(s) for resources (e.g., radio resources) associated with effected device group(s), and an associated disconnect action/type of disconnect indication. In at least one embodiment, a disconnect command/message generated by the UDF 130 may be a Remote Authentication Dial-in User Service (RADIUS) Packet of Disconnect (PktOfDisconnect) command/message including corresponding disconnect parameters for one or more groups of devices that are to be disconnected from the network.

In one embodiment, if UDF 130 is configured to a part of/functional logic of UDM 126 and/or a PCF, and if group-id allocation is to be performed as part of a PDU session establishment procedure for a given wireless device, the SMF 124 could query the UDF 130 for an allocation for the wireless device group-id(s) for a given wireless device 102 device during session establishment for the device. In such an embodiment, when the UDF 130 obtains a notification of a disconnect that is to be performed for one or more device group(s) (e.g., from other functionality of the UDM 126 and/or from a PCF), the UDF 130 may be responsible for identifying the group-id(s) that are to be disconnected, which could be determined via a policy configured for UDF 130/UDM 126/etc., via logical learning of the mobile core network 120/sessions established for the network (e.g., all PDU sessions anchored on UPF 128 could receive the same group-id or all device types of 'Robot' could be assigned the same group-id, etc.).

Upon generating a disconnect command/message, the UDF 130 can send the disconnect command/message to a AMF 122. The AMF 122 can identify all the wireless devices 102 that are to be disconnected based on the parameters of the disconnect command/message (e.g., group indication/criteria/filter parameter(s) (e.g., group-id(s), S-NSSAI(s), etc.), location/area/region parameters, and/or type of disconnect/disconnect action parameters contained in a PktOfDisconnect) and can identify all of the gNodeBs/ cells to which the disconnect command/message is to be sent, for example, based on the location/area/region parameter(s) contained in the disconnect command/message.

For example, in one instance if a disconnect is triggered for device group 104-1 associated with TAI:1 of FIG. 1, AMF 122 could send a disconnect command/message to each of gNodeB 112-1 (through which wireless devices 102-1 and 102-2 belonging to device group 104-1 are connected to mobile core network 120) and gNodeB 112-2 (through which each of wireless devices 102-3 and 102-4 belonging to device group 104-2 and each of wireless devices 102-5, 102-6, and 102-7 belonging to device group 104-3 are connected to mobile core network 120).

In this example, on receiving the disconnect command/ message in at least one embodiment, each of gNodeB 112-1 and 112-2 can include the group indication (e.g., group-id(s), etc.) in a broadcast message transmitted by each gNodeB 112-1 and 112-2, along with an indication of associated disconnect action/type of disconnect. In various embodiments, the broadcast message can be transmitted in a broadcast channel that is specific to session updates or can be transmitted via an overloaded paging channel that includes new session information (e.g., a disconnect command/message).

Wireless devices in the broadcast region can receive the broadcast message (e.g., with a session update). Upon receiving the broadcast message, each wireless device 102 can check to determine if there is match for the criteria included in the message (group-id, S-NSSAI, etc.) based on the current device contexts and if there is a match, the associated wireless devices can perform the disconnect action as identified in the broadcast message (e.g., PDU session release and/or reconnect, device unregister and/or reregister, etc.).

Such a network-initiated disconnect capability may be applicable/useful for many different scenarios. For example, consider an example scenario in which such a capability may be useful in which, for a 5G-as-a-Service (5GaaS) deployment, it may be desirable to deactivate a set of endpoints (wireless devices), such as robots, machine tools, industrial router gateways, etc. In such a scenario each endpoint may include an (e-)(i-)SIM that is configured to part of the same device group in which subscription data for each (e-)(i-)SIM is such that part of the subscription data is configured based on data for the whole group and part of the subscription data is individualized by (e-)(i-)SIM. For example, the group data could have a field that is 'deactivate yes/no' that could be mapped to a device group disconnect that could be broadcast to the endpoints.

In this example, then the group is to be deactivated, group subscription data can be updated to 'Deactivate Yes' as a result of a user interface (UI) interaction or via enterprise application programming interface (API) calls, which could result in the subscription data for the group being updated at each of the AMFs where the group is present. This approach would contribute to reducing a maintenance window for endpoint software upgrades, for example.

Another example could be a scenario in which wireless devices could have a PDU Session-1 belonging to a Group ID 'A', a PDU Session-2 belonging to Group ID 'A', and a PDU Session-3 belonging a Group ID '13'. In this example, if "Group ID A" is marked for update/deletion, corresponding wireless devices could locally purge PDU Session-1 and PDU Session-2 but maintain the PDU Session-3 as is. Similar examples can be imagined for cellular connected devices in a metro area for a macro 5G example. In such scenarios, it is assumed that the network would purge the sessions locally, prior to issuing any such broadcast.

Consider various operational details for providing network slice admission control in a mobile network environment in at least one embodiment, with further reference to FIGS. 2A and 2B, discussed below. For example, FIGS. 2A and 2B are a message sequence diagram illustrating a call flow 200 associated with providing a network-initiated group disconnect for wireless devices, according to an example embodiment.

Figure 2A:
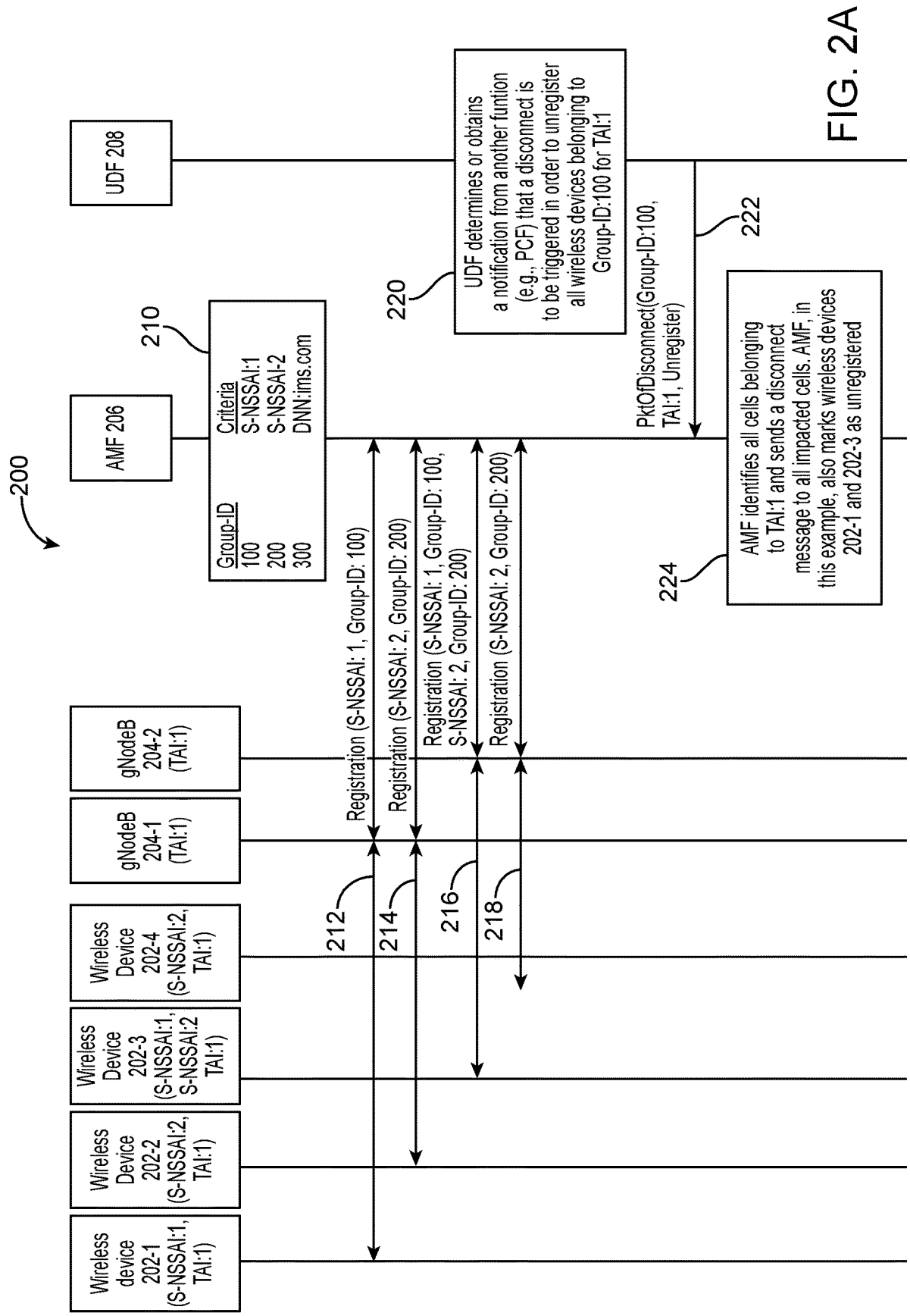
FIGS. 2A and 2B are a message sequence diagram illustrating a call flow associated with providing a network-initiated group disconnect for wireless devices, according to an example embodiment.
Figure 2B:
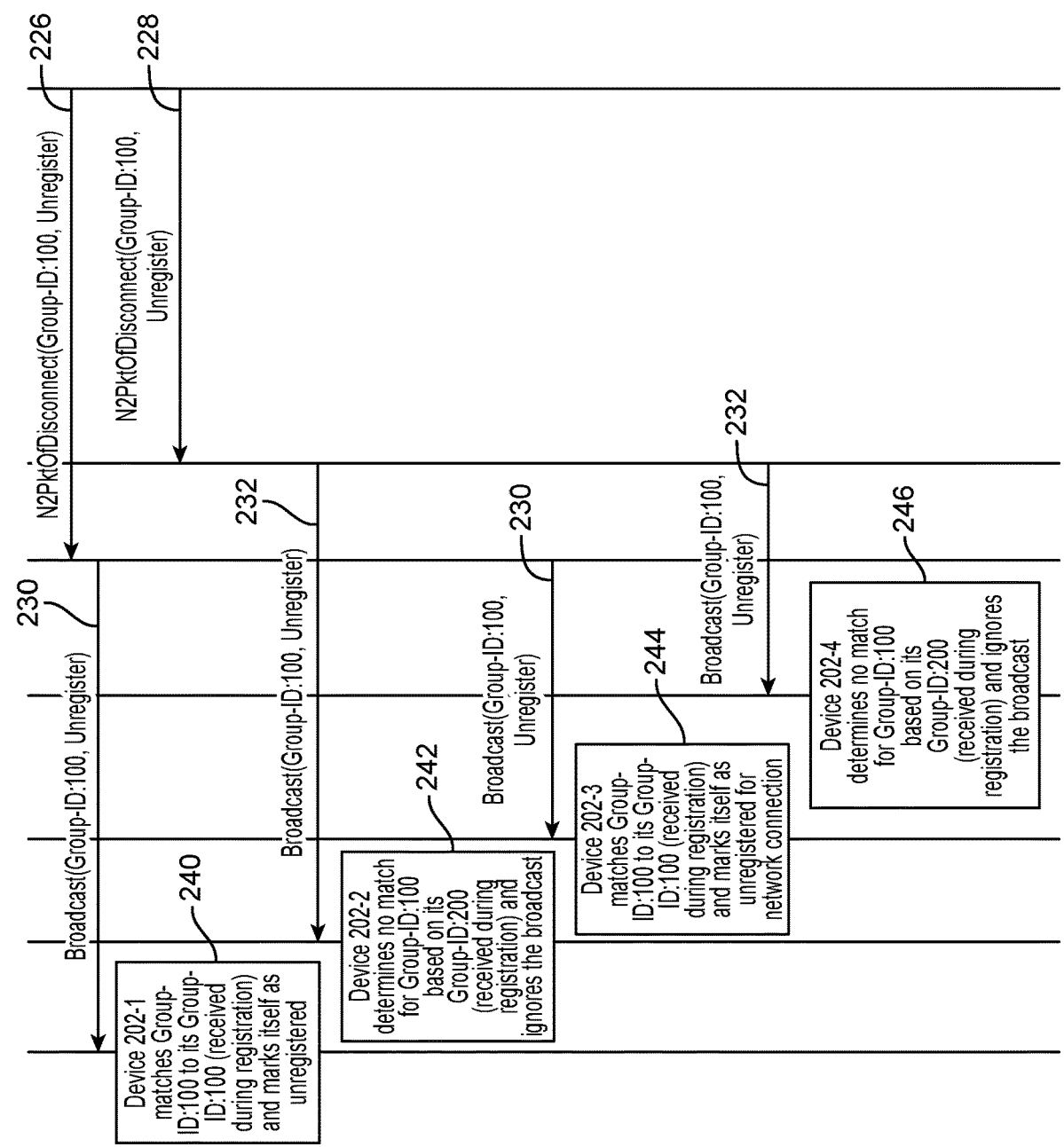

Consider for the example operations discussed herein that FIGS. 2A and 2B include a number of wireless devices, such as a wireless device 202-1, a wireless device 202-2, a wireless device 202-3, and a wireless device 202-4. FIGS. 2A and 2B also including a number of access network radios, such as a gNodeB 204-1 and a gNodeB 204-2 (of a RAN, not shown in FIGS. 2A and 2B), and also an AMF 206, and a UDF 208 (of a mobile core network, also not shown in FIGS. 2A and 2B). It is to be understood wireless devices 202-1-202.4, gNodeBs 204-1 and 204-2, AMF 206, and UDF 208 may be implemented in any manner, as discussed for analogous elements of FIG. 1 and that any other network elements/functions may be accessed/interfaced by network elements/functions illustrated for FIGS. 2A-2B. For example, AMF 206 may further interface with an SMF, a UDM, a PCF, etc. as discussed for FIG. 1.

For FIGS. 2A and 2B, consider that gNodeB 204-1 and gNodeB 204-2 each provided a coverage area for a tracking area identified as TAI:1. Further consider that wireless device 202-1 is to seek registration for a network slice identified as S-NSSAI:1 via TAI:1, that wireless device 202-2 is to seek registration for a network slice identified as S-NSSAI:2 via TAI:1, that wireless device 202-3 is to seek registration for network slice S-NSSAI:1 and S-NSSAI:2 via TAI:1, and that wireless device 202-4 is to seek registration for network slice S-NSSAI:2 via TAI:1.

As shown at 210, consider that AMF 206 obtains device group information 210 for one or more groups configured for the embodiment of FIGS. 2A and 2B. For example, AMF 206 can obtain device group information 210 from a UDM (not shown in FIGS. 2A and 2B) before or during registration for any of wireless devices 202-1-202-4. In this example, consider that device group information 210 identifies that wireless devices registering with S-NSSAI:1 are to be assigned/allocated a Group-ID of '100' (S-NSSAI: 1→Group-ID:100), that wireless devices registering with S-NSSAI:2 are to be assigned/allocated a Group-ID of '200' (S-NSSAI:2→Group-ID:200), and that wireless devices connecting to a data network such as an IMS network are to be assigned/allocated a Group-ID of '300' (DNN:ims. com→Group-ID:300).

Thus, consider at 212 that wireless device 202-1, via an over-the-air RF connection with gNodeB 204-1 (TAI:1), performs a network registration for S-NSSAI:1 of the mobile core network with AMF 206 and is provided Group-ID:100 by AMF 206 based on the device group information

210. At 214, consider that wireless device 202-2, via an over-the-air RF connection with gNodeB 204-1 (TAI:1), performs a network registration for S-NSSAI:2 of the mobile core network with AMF 206 and is provided Group-ID:200 by AMF 206 based on the device group information 210. At 216, consider that wireless device 202-3, via an over-the-air RF connection with gNodeB 204-2 (TAI:1), performs a network registration for both of S-NSSAI:1 and S-NSSAI:2 of the mobile core network with AMF 206 and is provided both of Group-ID:100 and Group-ID:200 by AMF 206 based on the device group information 210. Thus, wireless device 202-3 is associated with two device groups for this example. Further, consider at 218 that wireless device 202-4 performs a network registration for S-NSSAI:2 of the mobile core network with AMF 206 and is provided Group-ID:200 by AMF 206 based on the device group information 210.

Thereafter, consider in this example at 220 that UDF 208 determines or obtains a notification from another network function (e.g., a PCF) that a disconnect is to be triggered in order to unregister all wireless devices belonging to Group-ID:100 for TAI:1. It is to be understood that the determination at 220 may be performed through any of the techniques discussed herein, such as determining a network failure of one or more network element(s) (e.g., a UPF) handling sessions for one or more device group(s) for one or more network area(s)/location(s), determining a maintenance event for one or more network element(s) handling sessions for one or more device group(s) for one or more network area(s)/location(s), forcing a disconnect for certain device(s), combinations thereof, etc.

Thus, at 222, UDF 208 generates and sends a disconnect command/message to a control element of the mobile core network, such as AMF 206, in which the disconnect command/message includes various disconnect parameters, such as an indication of the group of wireless devices that are to be disconnected from the network (e.g., Group-ID(s), as in this example, but the indication could be any combination of network attributes/criteria/filters/etc., such as S-NSSAI(s), session ID(s), etc. as discussed herein), includes an indication of an area of the wireless network for which the group of wireless devices are to be disconnected from the network (e.g., TAI(s), RAI(s), radio node ID(s), etc.), and includes an indication of an associated disconnect action/type of disconnect that is to be performed by the group of wireless devices. For example, at 222 in this example, UDF 208 can generate and send a disconnect command/message, which may be a PktOfDisconnect message that includes disconnect parameters such as Group-ID: 100, TAI:1, and a disconnect action indicating that the group of wireless devices of Group-ID: 100 are to unregister from the mobile core network.

Upon receiving the disconnect command/message, as shown at 224, AMF 206 can identify all cells/gNodeBs belonging to TAI:1, such as gNodeB 204-1 and gNodeB 204-2 in this example, and can send a disconnect command/message to the impacted cells/gNodeBs in which the disconnect command/message can include various disconnect parameters, such as an indication of the group of wireless devices that are to be disconnected from the network, which in this example is the indication indicating Group-ID:100 (e.g., with which wireless device 202-1 and 202-3 are associated), and can include an indication of the associated disconnect action/type of disconnect that is to be performed by the group of wireless devices of Group-ID:100, which in this example is that the group of wireless devices are to unregister from the mobile core network. In this example of FIGS. 2A and 2B, the AMF 206 can also mark the wireless devices 202-1 and 202-3 as unregistered with the network.

Continuing to FIG. 2B, consider at 226 that AMF 206 generates and sends the disconnect command/message to gNodeB 204-1 including disconnect parameters identifying Group-ID:100 and indicating an 'Unregister' action and at 228 sends the disconnect command/message to gNodeB 204-2 indicating the same disconnect parameters in order to trigger or otherwise cause the gNodeBs 204-1 and 204-2 to broadcast a disconnect command that causes wireless devices of the device group to disconnect from the network. In various embodiments, the disconnect command/message sent to each gNodeB 204-1 and 204.2 may be a PktOfDisconnect message sent over an N2 interface interconnecting AMF 206 and each of gNodeB 204-1 and 204-2 (e.g., an N2PktOfDisconnect message) and/or may be any API call to trigger each gNodeB to broadcast a disconnect command/message in accordance with embodiments herein.

Thereafter, consider that gNodeB 204-1 broadcasts a disconnect command/message at 230 that includes disconnect parameters identifying Group-ID:100 and an 'Unregister' disconnect action and that gNodeB 204-2 broadcasts a disconnect command/message at 232 that includes disconnect parameters identifying Group-ID:100 and an 'Unregister' disconnect action. Although two broadcasts (at 230) are illustrated for gNodeB 204-1 and two broadcasts (at 232) are illustrated for gNodeB 204-2, these duplicative indications are provided for illustrative purposes only in order to illustrate that all of the wireless devices 202-1, 202-2, 202-3, and 202-4 are to receive the broadcast from the corresponding gNodeB with which each wireless device is connected for this example. It is to be understood that a single disconnect broadcast can be performed by each of gNodeB 204-1 and gNodeB 204-2 in order to trigger a network-initiated group disconnect in accordance with embodiments herein.

As shown at 240, wireless device 202-1, upon receiving the disconnect broadcast (230) from gNodeB 204-1 matches the Group-ID:100 included in the broadcast to its received Group-ID:100 (received during the registration at 212) and, based on the 'Unregister' action identified in the disconnect broadcast, marks itself as unregistered with the network.

As shown at 242, wireless device 202-2, upon receiving the disconnect broadcast (232) from gNodeB 204-2 does not match the Group-ID:100 included in the broadcast to its received Group-ID:200 (received during the registration at 214) and, thus, ignores the broadcast.

As shown at 244, wireless device 202-3, upon receiving the disconnect broadcast (230) from gNodeB 204-1 matches the Group-ID:100 included in the broadcast to its received Group-ID:100 (received during the registration at 214, along with Group-ID:200) and, based on the 'Unregister' action identified in the disconnect broadcast, marks itself as unregistered with the network.

Further, as shown at 246, wireless device 202-4, upon receiving the disconnect broadcast (232) from gNodeB 204-2 does not match the Group-ID:100 included in the broadcast to its received Group-ID:200 (received during the registration at 214) and, thus, ignores the broadcast.

Accordingly, techniques herein facilitate leveraging session-level device grouping(s) such that system registration and/or session update procedures can be broadcast via a radio access network to one or more device group(s) without having to perform individual per-device level updates for each wireless device of each device group. The network-initiated group disconnect techniques described herein can improve spectrum utilization in a wireless network, reduce signaling between a RAN and mobile core network/wireless network controller functions, and/or reduce operational overhead during failure scenarios or critical operation scenarios.

Figure 3:
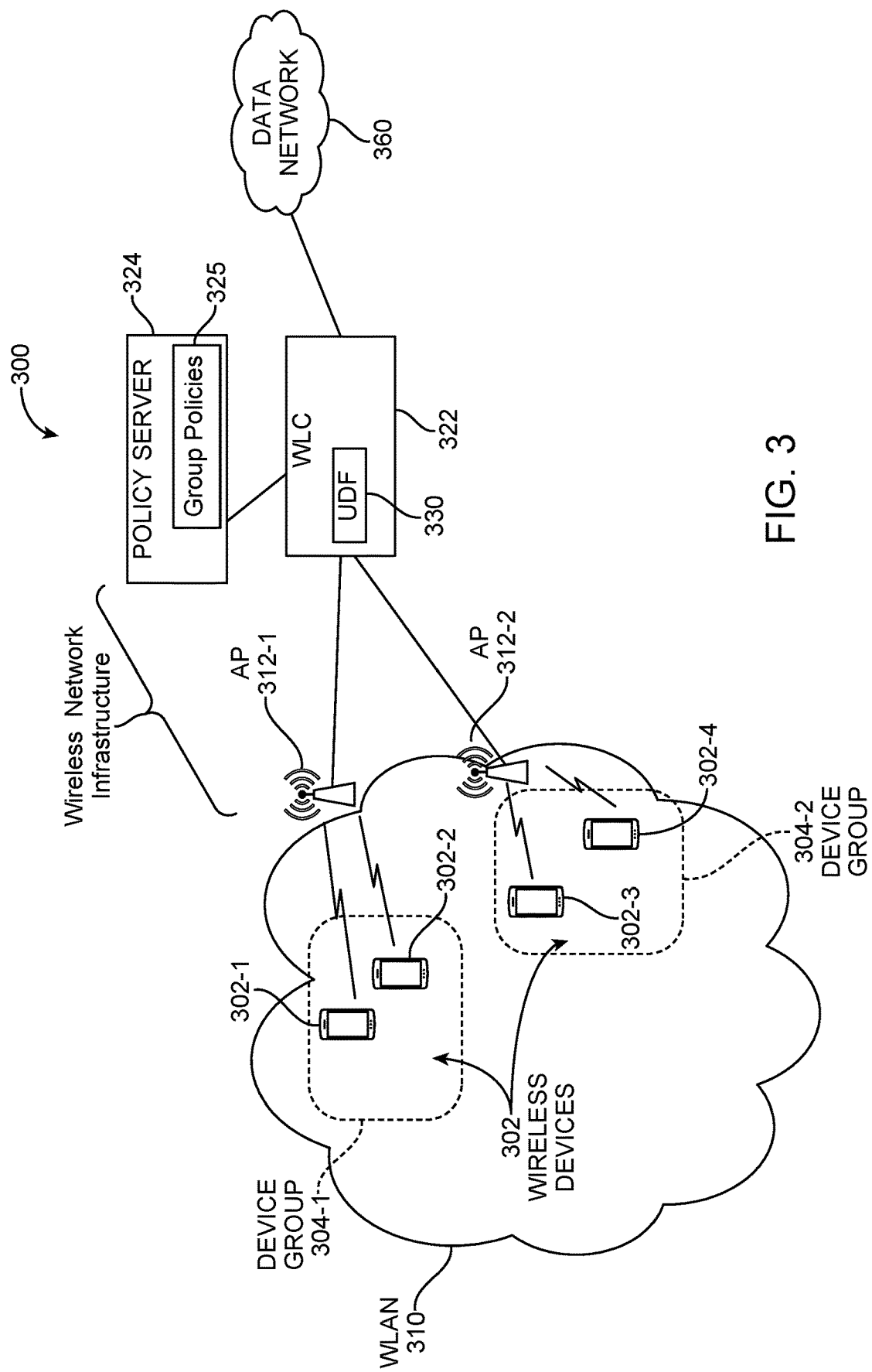
FIG. 3 is a block diagram of another system in which techniques may be implemented to provide a network-initiated group disconnect for wireless devices, according to an example embodiment.

Techniques herein may not be limited to performing network-initiated disconnects for one or more wireless device group(s) connected to a WWA access network (e.g., 5G/nG mobile network), but may also be extended to performing network-initiated disconnects for one or more wireless device group(s) connected to a WLA access network, typically referred to as a wireless local area network (WLAN), in accordance with various embodiments. Referring to FIG. 3, FIG. 3 is a block diagram of another system 300 in which techniques may be implemented to provide a network-initiated group disconnect for wireless devices, according to an example embodiment.

As illustrated in FIG. 3, system 300 may include a WLAN 310 including a number of wireless access network radio nodes, such as an access point (AP) 312-1 and an access point 312-2, a wireless LAN controller (WLC) 322, a policy server 324, a data network 360. Also shown in FIG. 1 are a number of wireless devices 302, such as a wireless device 302-1, a wireless device 302-2, a wireless device 302-3, and a wireless device 302-4. Wireless devices 302-1 and 302-2 may be allocated to a device group 304-1 and wireless devices 302-3 and 302-4 may be allocated to a device group 304-2 for the embodiment of FIG. 3.

As shown in FIG. 3, WLC 322 may be configured with a UDF 330, and policy server may be configured with a number of group policies 325. UDF 330 may be configured in any manner for any UDF discussed for any embodiments described herein.

Generally, WLC 322 is connected to and communicates with data network 360, which may include one or more wide area networks (WANs), such as the Internet, and/or one or more LANs, such as one or more enterprise networks, etc. WLC 322 also communicates with and controls APs 312-1 and 312-2, which serve WLAN 310 within which wireless devices 302-1 and 302-2 can wirelessly connect to and be served by AP 312-1 and wireless devices 302-3 and 302-4 can wirelessly connect to and be served by AP 312-2. WLC 322 may serve as a bridge to transport traffic (e.g., data packets) between data network 360 and WLAN 310 (e.g., between data network 360 and wireless devices 302-1, 302-2, 302-3, and 302-4).

Together, WLC 322, APs 312-1 and 312-2, and policy server 324 may represent and be referred to herein as a 'wireless infrastructure' or 'wireless network infrastructure'. For example, APs 312-1 and 312-2 can provide wireless connectivity, such as IEEE 802.11 wireless connectivity (and variants thereof) for wireless device 302-1, 302-2, 302-3, and 302-4, which can communicate with WLC 322 and data network 360 via corresponding APs 312-1 and 312-2. During operation, wireless devices 302-1, 302-2, 302-3, and 302-4 can perform 802.11 association and authentication operations via policy server 324 in order to wirelessly attach/connect to WLAN 310 under control of WLC 322 in order to establish communication sessions within system 300. Once authenticated, wireless devices 302-1, 302-2, 302-3, and 302-4 may exchange packets with data network 360 via corresponding APs 312-1/312-2 and WLC 322. In some embodiments, policy server 324 may be implemented as an Authentication, Authorization, and Accounting (AAA) function. In some embodiments, policy server 324 may be implemented as a Cisco® Identity Services Engine (ISE).

For the embodiment of FIG. 3, WLC 322 may be considered a control element that may facilitate a network-initiated group disconnect for one or more group(s) of wireless devices 302. In one example consider that two wireless device groups 304-1 and 304-2 are configured for system 300 via group policies 325 provided for policy server 324 such that wireless devices 302-1 and 302-2 may be allocated to belong to device group 304-1 based on a group tag (e.g., 'Group-Tag:1') that may be allocated to each of the wireless devices 302-1 and 302-2 and wireless devices 302-3 and 302-4 may be allocated to belong to device group 304-2 (e.g., 'Group-Tag: 2') that may be allocated to each of wireless devices 302-3 and 302-4.

In at least one embodiment, wireless device groups configured/allocated/assigned for a wireless network infrastructure/WLAN, such as illustrated in FIG. 3, based on group tag(s) that may be provided for wireless devices based on different types or classes of wireless devices, different operations of wireless devices, different applications operating on wireless devices, different traffic/communication characteristics of wireless devices, based on an 802.11 Service Set Identifier (SSID) to which devices are wireless attached, based on a specific AP to which devices are wirelessly attached combinations thereof, and/or the like. For example, in an enterprise environment, different group tags can be configured for different wireless devices, such as laptops/UEs, light bulbs, printers, smoke detectors, automated guided vehicles (AGVs), industrial robots, sensors, cameras/camera systems, etc.

During operation of a wireless network infrastructure/WLAN, such as illustrated for the embodiment of FIG. 3, for a given SSID provided by an AP, such as AP 312-1/312-2, when a wireless device (typically referred to as a client or station (STA)) is attached to an AP, the policy server 324 can determine a classification for a given wireless device and can mark a session for the device with a group tag, such as a scalable or security group tag (SGT), or the like. WLC 322/UDF 330 can perform bulk operations on a class/group of wireless devices, such as triggering network-initiated disconnect(s) for one or more group(s) of wireless devices.

For example, in some instances, the policy server 324 may provide a notification to WLC 322/UDF 330 regarding a disconnect that is to be performed for one or more of device group(s) 304-1 and/or 304-2 based on one or more particular group tag(s) associated with wireless devices of the device group(s) (e.g., Group-Tag:1 and/or Group-Tag:2). Obtaining the notification can trigger WLC 322 to perform a lookup on all sessions that are marked with the particular group tag(s) in order to identify radio node(s) (e.g., AP(s)) for network region(s)/area(s)/location(s) that are to be effected by the group disconnect (e.g., wireless device 302-1 and 302-2 having Group-Tag:1 sessions for to AP 312-1 and wireless devices 302-3 and 302-2 having Group-Tag:2 sessions for AP 312-2). Upon identifying the radio node(s), WLC 322 can send a disconnect command or other disconnect indication/message to each identified radio node (AP) in which each AP can broadcast a disconnect command/action to corresponding wireless device groups.

In various embodiments, a disconnect command/indication/message may be broadcast on the air interface for corresponding AP(s) using a beacon, a probe response, an action frame, a robust action frame (e.g., encrypted frame), and/or the like. Generally, robust action frames are management frames that are protected via the 802.11w Protected Management Frames (PMF) service, which provides for protecting frames through source validation and/or payload protection.

In various embodiments, disconnect actions that may be provided for WLANs may include instructing wireless devices of one or more device group(s) to disassociate with a given AP/SSID, reassociate with a given AP/SSID, other additional information indicating operations/processes to be performed by wireless devices as part of a disconnect/detach action combinations thereof, or the like. In various embodiments, additional information included for a disconnect command may include indicating that wireless devices are to reattach within a certain time period or range (e.g., within one hour, etc.) of performing a particular disconnect action, indicating that wireless devices are to reattach after performing a reboot, combinations thereof, and/or the like.

Figure 4:
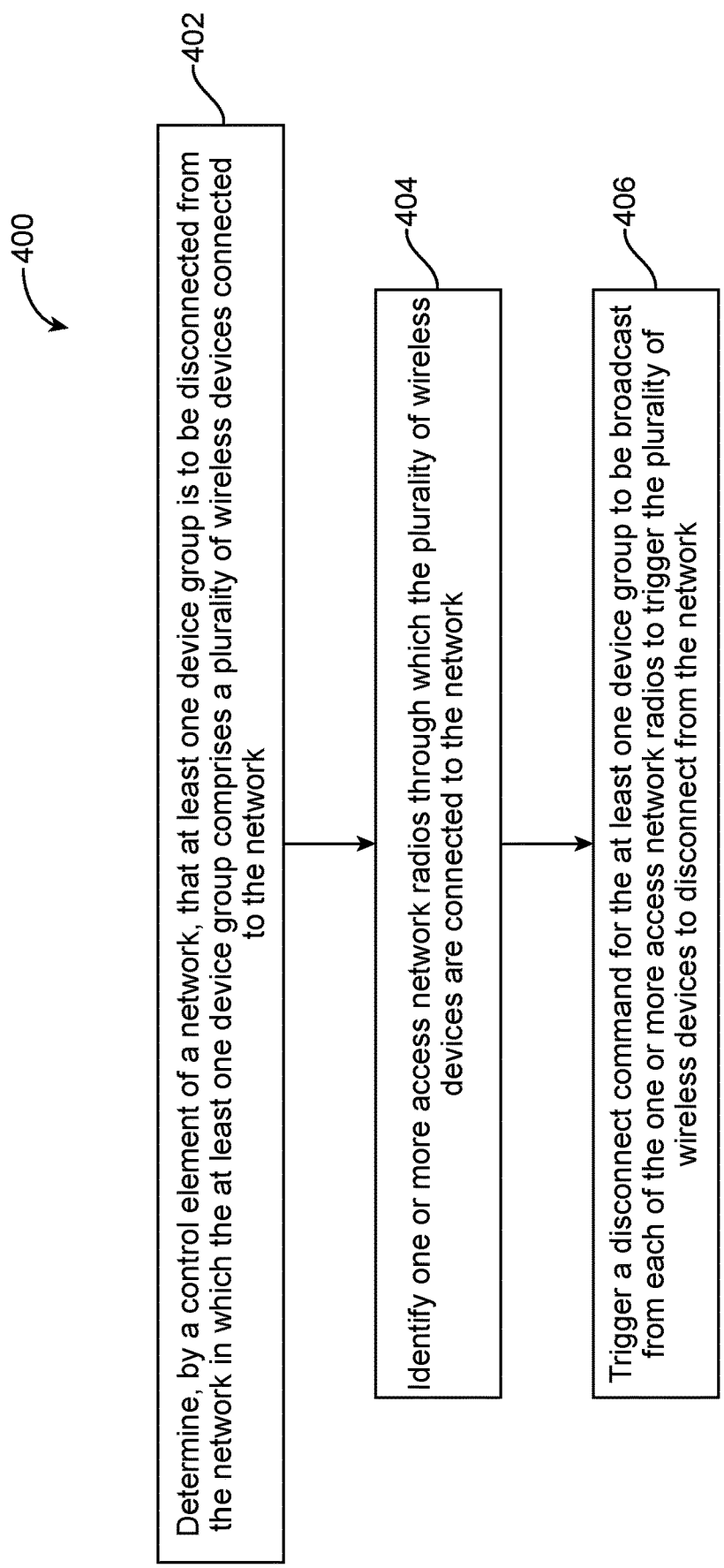
FIG. 4 is a flow chart depicting a method according to an example embodiment.

Referring to FIG. 4, FIG. 4 is a flow chart depicting a method 400 according to an example embodiment. In at least one embodiment, method 400 illustrates example operations that may be performed by a control element of a wireless network, such as AMF 122 of mobile core network 120 shown in FIG. 1 or WLC 322 of WLAN 310 shown in FIG. 3, according to various example embodiments.

At 402, the method may include determining, by a control element of a network, that at least one device group is to be disconnected from the network in which the at least one device group comprises a plurality of wireless devices connected to the network. At 404, the method may include identifying (by the control element) one or more access network radios through which the plurality of wireless devices are connected to the network. At 406, the method may include triggering (by the control element) a disconnect command for the at least one device group to be broadcast from each of the one or more access network radios to trigger the plurality of wireless devices to disconnect from the network. In at least one embodiment, triggering the disconnect command to be broadcast from the access network radios may include the control element communicating a disconnect command/message (e.g., N2PktOfDisconnect, etc.) to each of the access network radios, which causes to access network radios to broadcast the disconnect command.

Accordingly, techniques herein facilitate leveraging session-level device grouping(s) such that system registration and/or session update procedures can be broadcast via a radio access network to one or more device group(s) without having to perform individual per-device level updates for each wireless device of each device group. The network-initiated group disconnect techniques described herein can improve spectrum utilization in a wireless network, reduce signaling between a RAN and mobile core network/wireless network controller functions, and/or reduce operational overhead during failure scenarios or critical operation scenarios.

Figure 5:
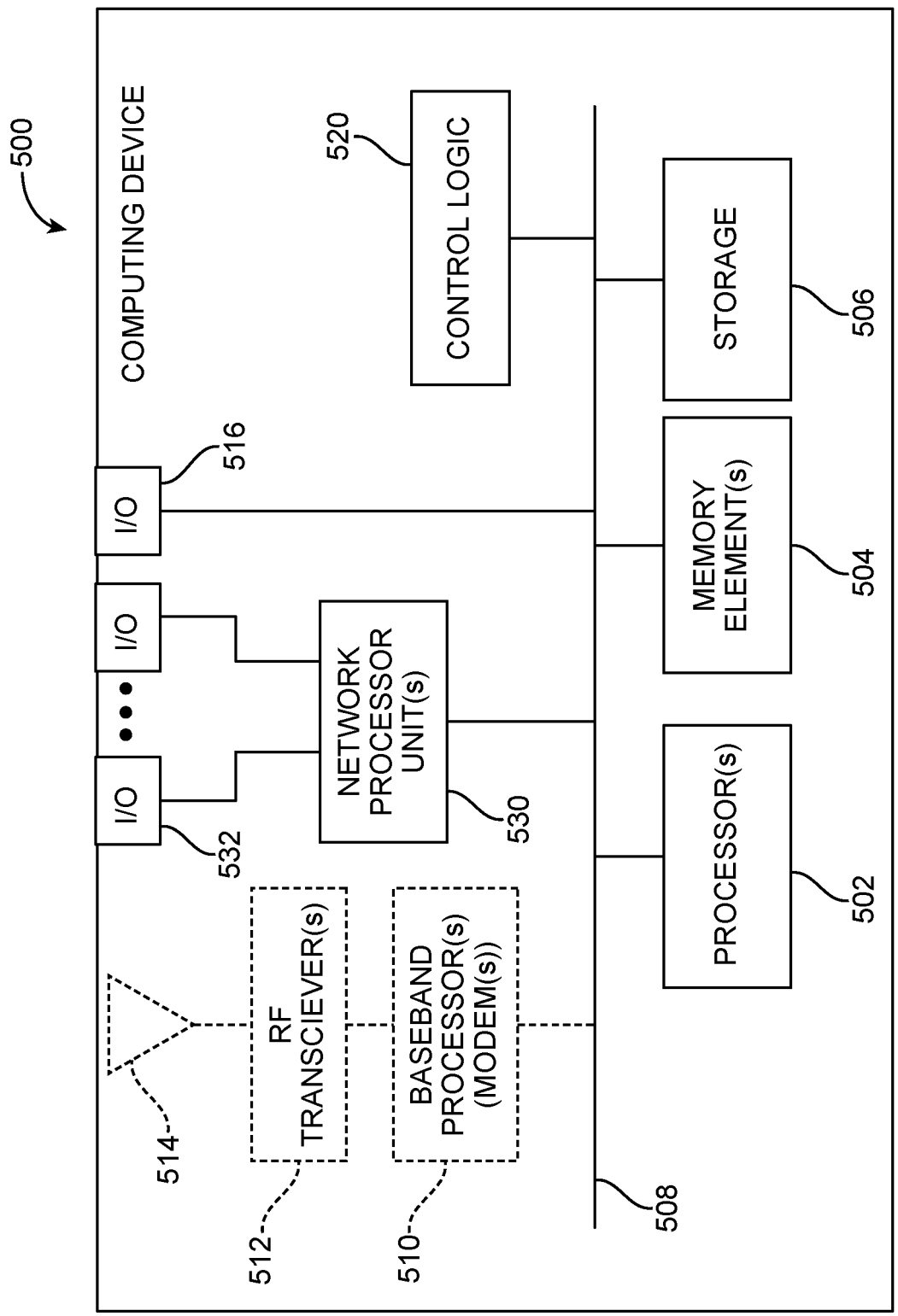
FIG. 5 is a hardware block diagram of a computing device that may perform functions associated with any combination of operations, in connection with the techniques discussed herein.

Referring to FIG. 5, FIG. 5 illustrates a hardware block diagram of a computing device 500 that may perform functions associated with operations discussed herein. In various embodiments, a computing device or apparatus, such as computing device 500 or any combination of computing devices 500, may be configured as any entity/entities as discussed herein in order to perform operations of the various techniques discussed herein, such as, for example, any of wireless devices 102/302, AMF 122, SMF 124, UDM 126, UPF 128, gNodeBs 112-1/112-2, WLC 322, policy server 324, APs 312-1/312-2 and/or any other element discussed for embodiments herein.

In at least one embodiment, computing device 500 may be any apparatus that may include one or more processor(s) 502, one or more memory element(s) 504, storage 506, a bus 508, one or more I/O interface(s) 516, control logic 520, one or more one network processor unit(s) 530 and one or more network I/O interface(s) 532. In various embodiments, instructions associated with logic for computing device 500 can overlap in any manner and are not limited to the specific allocation of instructions and/or operations described herein.

For embodiments in which computing device 500 may be implemented as a wireless device or a radio node/access network radio (e.g., gNodeB, AP, etc.), computing device may further include at least one baseband processor or modem 510, one or more radio RF transceiver(s) 512, one or more antenna(s) or antenna array(s) 514.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, graphical processing units (GPUs), microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that are configured for computing device 500. In at least one embodiment, bus 508 is implemented as a fast kernel-hosted interconnect, potentially using shared memory between processes (e.g., logic), which can enable efficient communication paths between the processes.

Network processor unit(s) 530 may enable communication between computing device 500 and other systems, devices, or entities, via network I/O interface(s) 532 (wired and/or wireless) to facilitate operations discussed for various embodiments described herein. In various embodiments, network processor unit(s) 530 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between computing device 500 and other systems, devices, or entities to facilitate operations for various embodiments described herein. In various embodiments, network I/O interface(s) 532 can be configured as one or more Ethernet port(s), Fibre Channel ports, any other I/O port(s), and/or antenna(s)/antenna array(s) now known or hereafter developed. Thus, the network processor unit(s) 530 and/or network I/O interface(s) 532 may include suitable interfaces for receiving, transmitting, and/or otherwise communicating data and/or information (wired and/or wirelessly) in a network environment.

I/O interface(s) 516 allow for input and output of data and/or information with other entities that are connected to computing device 500. For example, I/O interface(s) 516 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen. In some embodiments, the computing device 500 supports a display having touch-screen display capabilities.

For embodiments in which computing device 500 is implemented as a wireless device or a radio node/access network radio (e.g., gNodeB, AP, etc.), the RF transceiver(s) 512 may perform RF transmission and RF reception of wireless signals via antenna(s)/antenna array(s) 514, and the baseband processor (modem) 510 performs baseband modulation and demodulation, etc. associated with such signals to enable wireless communications for computing device 500.

In various embodiments, control logic 520 can include instructions that, when executed, cause processor(s) 502 to perform operations, which can include, but not be limited to, providing overall control operations of computing device 500; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein. For example, for embodiments in which computing device 500 is implemented as a control element of a network, such as ANF 122 of mobile core network 120 of FIG. 1 or WLC 322 of the wireless network infrastructure of FIG. 3, control logic 520 can include instructions that, when executed, cause processor(s) 502 to performed operations, which can include, but not be limited to determining that at least one device group is to be disconnected from the network in which the at least one device group comprises a plurality of wireless devices connected to the network; identifying one or more access network radios through which the plurality of wireless devices are connected to the network; and triggering a disconnect command for the at least one device group to be broadcast from each of the one or more access network radios to trigger the plurality of wireless devices to disconnect from the network.

The programs described herein (e.g., control logic 520 of computing device 500) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 504 of computing device 500) and/or storage (e.g., storage 506 of computing device 500) can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include determining, by a control element of a network, that at least one device group is to be disconnected from the network, wherein the at least one device group comprises a plurality of wireless devices connected to the network; identifying one or more access network radios through which the plurality of wireless devices are connected to the network; and triggering a disconnect command for the at least one device group to be broadcast from each of the one or more access network radios to trigger the plurality of wireless devices to disconnect from the network.

In one instance, determining that the at least one device group is to be disconnected from the network includes obtaining a communication from a function indicating that a disconnect action is to be performed for the at least one device group. In one instance, the function is external to the control element and includes one of a Third Generation Partnership Project (3GPP) Application Function or a function of an enterprise network.

In one instance, the communication includes one or more identifiers that enable the control element to identify the one or more access network radios with which the plurality of wireless devices are connected. In one instance, the one or more identifiers include: location information associated with the one or more access network radios; one or more Tracking Area Identifiers (TAIs) associated with the one or more access network radios; one or more Routing Area Identifiers (RAIs) associated with the one or more access network radios; or one or more radio identifiers (IDs) associated with the one or more access network radios.

In one instance, the method may further include, upon registration or session establishment with the network for a particular wireless device of the plurality of wireless devices, identifying one or more group identifiers corresponding to one or more device groups to which the particular wireless device belongs; and communicating the one or more group identifiers to the particular wireless device. In one instance, the disconnect command comprises at least one group identifier corresponding to the at least one device group. In one instance, the disconnect command further comprises one of: an indication that the plurality of wireless devices of the at least one device group are to unregister from the network; an indication that the plurality of wireless devices of the at least one device group are to unregister and reregister with the network; an indication that the plurality of wireless devices of the at least one device group are to release one or more Protocol Data Unit (PDU) sessions with the network; an indication that the plurality of wireless devices of the at least one device group are to release and reconnect one or more Protocol Data Unit (PDU) sessions with the network; an indication that the plurality of wireless devices of the at least one device group are to disassociate with an access point or a Service Set Identifier (SSID); or an indication that the plurality of wireless devices of the at least one device group are to disassociate with an access point or a Service Set Identifier (SSID) and reassociated with the access point or SSID.

In one instance, the disconnect command comprises a network-related attribute associated with the at least one device group. In one instance, the network-related attribute is at least one of a network slice identifier or a session identifier associated with the at least one device group. In one instance, the disconnect command comprises one of: an indication that the plurality of wireless devices of the at least one device group are to unregister from the network; an indication that the plurality of wireless devices of the at least one device group are to unregister and reregister with the network; an indication that the plurality of wireless devices of the at least one device group are to deactivate one or more Protocol Data Unit (PDU) sessions with the network; an indication that the plurality of wireless devices of the at least one device group are to deactivate and reactivate one or more Protocol Data Unit (PDU) sessions with the network; an indication that the plurality of wireless devices of the at least one device group are to disassociate with an access point or a Service Set Identifier (SSID); or an indication that the plurality of wireless devices of the at least one device group are to disassociate with an access point or a Service Set Identifier (SSID) and reassociated with the access point or SSID.

In one instance, the control element is an Access and Mobility Management Function (AMF). In one instance, the control element is a wireless local area network controller.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    determining, by a control element of a network, that at least one device group is to be disconnected from the network, wherein the at least one device group comprises a plurality of wireless devices connected to the network;
    identifying one or more access network radios through which the plurality of wireless devices are connected to the network; and
    triggering a disconnect command for the at least one device group to be broadcast from each of the one or more access network radios to trigger the plurality of wireless devices to disconnect from the network.

2. The method of claim 1, wherein determining that the at least one device group is to be disconnected from the network includes obtaining a communication from a function indicating that a disconnect action is to be performed for the at least one device group.

3. The method of claim 2, wherein the function is external to the control element and includes one of a Third Generation Partnership Project (3GPP) Application Function or a function of an enterprise network.

4. The method of claim 2, wherein the communication includes one or more identifiers that enable the control element to identify the one or more access network radios with which the plurality of wireless devices are connected.

5. The method of claim 4, wherein the one or more identifiers include:
    location information associated with the one or more access network radios;
    one or more Tracking Area Identifiers (TAIs) associated with the one or more access network radios;
    one or more Routing Area Identifiers (RAIs) associated with the one or more access network radios; or
    one or more radio identifiers (IDs) associated with the one or more access network radios.

6. The method of claim 1, further comprising:
    upon registration or session establishment with the network for a particular wireless device of the plurality of wireless devices, identifying one or more group identifiers corresponding to one or more device groups to which the particular wireless device belongs; and
    communicating the one or more group identifiers to the particular wireless device.

7. The method of claim 6, wherein the disconnect command comprises at least one group identifier corresponding to the at least one device group.

8. The method of claim 7, wherein the disconnect command further comprises one of:
   an indication that the plurality of wireless devices of the at least one device group are to unregister from the network;
   an indication that the plurality of wireless devices of the at least one device group are to unregister and reregister with the network;
   an indication that the plurality of wireless devices of the at least one device group are to release one or more Protocol Data Unit (PDU) sessions with the network;
   an indication that the plurality of wireless devices of the at least one device group are to release and reconnect one or more Protocol Data Unit (PDU) sessions with the network;
   an indication that the plurality of wireless devices of the at least one device group are to disassociate with an access point or a Service Set Identifier (SSID); or
   an indication that the plurality of wireless devices of the at least one device group are to disassociate with an access point or a Service Set Identifier (SSID) and reassociate with the access point or SSID.

9. The method of claim 1, wherein the disconnect command comprises a network-related attribute associated with the at least one device group.

10. The method of claim 9, wherein the network-related attribute is at least one of a network slice identifier or a session identifier associated with the at least one device group.

11. The method of claim 10, wherein the disconnect command comprises one of:
    an indication that the plurality of wireless devices of the at least one device group are to unregister from the network;
    an indication that the plurality of wireless devices of the at least one device group are to unregister and reregister with the network;
    an indication that the plurality of wireless devices of the at least one device group are to deactivate one or more Protocol Data Unit (PDU) sessions with the network;
    an indication that the plurality of wireless devices of the at least one device group are to deactivate and reactivate one or more Protocol Data Unit (PDU) sessions with the network;
    an indication that the plurality of wireless devices of the at least one device group are to disassociate with an access point or a Service Set Identifier (SSID); or
    an indication that the plurality of wireless devices of the at least one device group are to disassociate with an access point or a Service Set Identifier (SSID) and reassociate with the access point or SSID.

12. The method of claim 1, wherein the control element is an Access and Mobility Management Function (AMF).

13. The method of claim 1, wherein the control element is a wireless local area network controller.

14. One or more non-transitory computer readable storage media encoded with instructions that, when executed by a processor, cause the processor to perform operations, comprising:
    determining, by a control element of a network, that at least one device group is to be disconnected from the network, wherein the at least one device group comprises a plurality of wireless devices connected to the network;
    identifying one or more access network radios through which the plurality of wireless devices are connected to the network; and
    triggering a disconnect command for the at least one device group to be broadcast from each of the one or more access network radios to trigger the plurality of wireless devices to disconnect from the network.

15. The media of claim 14, wherein determining that the at least one device group is to be disconnected from the network includes obtaining a communication from a function indicating that a disconnect action is to be performed for the at least one device group.

16. The media of claim 15, wherein the communication includes one or more identifiers that enable the control element to identify the one or more access network radios with which the plurality of wireless devices are connected.

17. A control element for a network, comprising:
    at least one memory element for storing data; and
    at least one processor for executing instructions associated with the data, wherein executing the instructions causes the control element to perform operations, comprising:
        determining, by a control element of a network, that at least one device group is to be disconnected from the network, wherein the at least one device group comprises a plurality of wireless devices connected to the network;
        identifying one or more access network radios through which the plurality of wireless devices are connected to the network; and
        triggering a disconnect command for the at least one device group to be broadcast from each of the one or more access network radios to trigger the plurality of wireless devices to disconnect from the network.

18. The control element of claim 17, wherein determining that the at least one device group is to be disconnected from the network includes obtaining a communication from a function indicating that a disconnect action is to be performed for the at least one device group.

19. The control element of claim 18, wherein the communication includes one or more identifiers that enable the control element to identify the one or more access network radios with which the plurality of wireless devices are connected.

20. The control element of claim 17, wherein executing the instructions causes the control element to perform further operations, comprising:
    upon registration or session establishment with the network for a particular wireless device of the plurality of wireless devices, identifying one or more group identifiers corresponding to one or more device groups to which the particular wireless device belongs; and
    communicating the one or more group identifiers to the particular wireless device.

* * * * *